US 8,620,276 B2

(12) United States Patent
Khoury

(10) Patent No.: US 8,620,276 B2
(45) Date of Patent: *Dec. 31, 2013

(54) AUTOMATIC WIRELESS DEVICE MESSAGE MANAGEMENT RESPONSIVE TO END USER PREFERENCES

(75) Inventor: Sami Khoury, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,885

(22) Filed: Mar. 6, 2012

(65) Prior Publication Data

US 2012/0172007 A1 Jul. 5, 2012

Related U.S. Application Data

(63) Continuation of application No. 11/118,511, filed on Apr. 29, 2005, now Pat. No. 8,155,624.

(51) Int. Cl.
*H04M 1/725* (2006.01)

(52) U.S. Cl.
USPC .......... 455/412.1; 455/412.2; 455/414.1; 455/418; 455/466; 455/574; 455/406

(58) Field of Classification Search
USPC ............ 455/412.1, 412.2, 343.1, 343.2, 455/343.4–343.6, 574, 414.1, 418, 466, 455/406–406, 419; 370/229, 230, 230.1, 370/231, 235, 236.1
See application file for complete search history.

(56) References Cited

U.S. PATENT DOCUMENTS

| 6,169,911 | B1 | 1/2001 | Wagner et al. | |
| 6,233,430 | B1 | 5/2001 | Helferich | |
| 6,298,231 | B1 | 10/2001 | Heinz | |
| 6,363,412 | B1 * | 3/2002 | Niwa et al. | 709/203 |
| 6,462,646 | B2 | 10/2002 | Helferich | |
| 6,498,930 | B1 | 12/2002 | Mamaghani | |
| 6,577,717 | B1 | 6/2003 | Henon | |
| 6,965,917 | B1 * | 11/2005 | Aloni et al. | 709/206 |

(Continued)

FOREIGN PATENT DOCUMENTS

| EP | 1051018 A3 | 11/2000 |
| JP | 10-013543 | 1/1998 |

(Continued)

OTHER PUBLICATIONS

Chinese First Office Action mailed Nov. 20, 2009, in Chinese Application No. 200680011272.5 (13 pages).

(Continued)

*Primary Examiner* — Olumide T Ajibade Akonai
(74) *Attorney, Agent, or Firm* — Merchant & Gould, P.C.

(57) ABSTRACT

Automatically retrieving messages by a wireless telephone based on user preferences. A method of the invention receives a notification, on a wireless device, indicating that a computing device has a message for a user. One or more rules associated with the user are evaluated based on the received notification. The method also automatically requests the message from the computing device as a function of the evaluated rules and received from the computing device. The method further stores the received message in a memory area of the wireless telephone for rendering to the user. Alternatively, one or more rules associated with the user are dynamically generated by monitoring the user interaction with the wireless telephone.

20 Claims, 7 Drawing Sheets

(56) References Cited

U.S. PATENT DOCUMENTS

| | | | |
|---|---|---|---|
| 6,996,393 B2* | 2/2006 | Pyhalammi et al. | 455/412.1 |
| 6,999,759 B2* | 2/2006 | Harris et al. | 455/418 |
| 7,019,739 B2* | 3/2006 | Danis | 345/211 |
| 7,024,491 B1 | 4/2006 | Hanmann et al. | |
| 7,212,807 B2 | 5/2007 | Laumen et | |
| 7,236,770 B2 | 6/2007 | Sankaramanchi | |
| 7,240,095 B1 | 7/2007 | Lewis | |
| 7,280,818 B2 | 10/2007 | Clayton | |
| 7,356,571 B2* | 4/2008 | Haller | 709/217 |
| 7,458,184 B2 | 12/2008 | Lohtia | |
| 8,155,624 B2 | 4/2012 | Khoury | |
| 2002/0042286 A1 | 4/2002 | Ogoro | |
| 2002/0098831 A1 | 7/2002 | Castell et al. | |
| 2002/0137530 A1 | 9/2002 | Karve | |
| 2003/0128820 A1 | 7/2003 | Hirschberg et al. | |
| 2004/0008628 A1* | 1/2004 | Banerjee | 370/236.1 |
| 2004/0023643 A1 | 2/2004 | Vander Veen et al. | |
| 2004/0121761 A1 | 6/2004 | Tripathy et al. | |
| 2004/0132438 A1 | 7/2004 | White | |
| 2004/0266397 A1 | 12/2004 | Smith et al. | |
| 2005/0064883 A1 | 3/2005 | Heck et al. | |
| 2005/0114533 A1 | 5/2005 | Hullfish et al. | |
| 2005/0186943 A1 | 8/2005 | Hasan et al. | |
| 2005/0186944 A1 | 8/2005 | True et al. | |
| 2006/0003741 A1 | 1/2006 | Becker et al. | |
| 2006/0183465 A1 | 8/2006 | Helferich | |
| 2006/0194571 A1 | 8/2006 | Bossemeyer et al. | |
| 2006/0217126 A1 | 9/2006 | Sohm et al. | |

FOREIGN PATENT DOCUMENTS

| | | |
|---|---|---|
| JP | 2000-232531 | 8/2000 |
| JP | 2001-337882 | 8/2000 |
| JP | 2000-227882 | 12/2001 |
| JP | 2002-268650 | 9/2002 |
| JP | 2003-099353 | 4/2003 |
| JP | 2003-186785 | 7/2003 |
| JP | 2003-309659 | 10/2003 |
| JP | 2004-153754 | 5/2004 |
| KR | 1019990028168 | 4/1999 |
| WO | WO 03/003765 A1 | 1/2003 |
| WO | WO 2006/118658 | 11/2006 |

OTHER PUBLICATIONS

Chinese Notice of Allowance mailed Jul. 27, 2011; Chinese Application No. 200680011272.5, 4 pgs.
Chinese Response to Chinese First Office Action mailed Nov. 20, 2009, in Chinese Application No. 200680011272.5, filed Mar. 26, 2010 (8 pages).
Chinese Response to Chinese Second Office Action mailed Oct. 11, 2010, in Chinese Application No. 200680011272.5, (8 pages).
Chinese Second Office Action mailed Aug. 12, 2010, in Chinese Application No. 200680011272.5 (14 pages).
Chinese Third Office Action mailed Jan. 12, 2011, in Chinese Application No. 200680011272.5 (7 pages).
EP Search Report in European Application No. 06737441.3, mailed Jul. 11, 2011, 5 pages.
Japanese Notice of Rejection mailed Jun. 24, 2011 in Japanese Patent Application No. 2008-508842, 13 pgs.
PCT International Search Report mailed May 14, 2007 in PCT/US06/08270 (2 pages).
Unknown, "The New Era of Messaging: Nokia Multimedia Messaging Solution," Brochure, Jun. 2002, 4 pages, http://www.nokia.com/downloads/solutions/mobile_software/mms_solution_a3_net.pdf, Nokia Corporation, Finland.
U.S. Appl. No. 11/118,511, Amendment and Response filed Jan. 11, 2008, 10 pgs.
U.S. Appl. No. 11/118,511, Amendment and Response filed Oct. 20, 2010, 21 pgs.
U.S. Appl. No. 11/118,511, Amendment and Response filed Nov. 14, 2007, 9 pgs.
U.S. Appl. No. 11/118,511, Amendment and Response filed Nov. 9, 2011, 12 pgs.
U.S. Appl. No. 11/118,511, Amendment and Response filed Apr. 5, 2011, 10 pgs.
U.S. Appl. No. 11/118,511, Amendment and Response filed May 2, 2007, 9 pgs.
U.S. Appl. No. 11/118,511, Amendment and Response filed Aug. 3, 2009, 20 pgs.
U.S. Appl. No. 11/118,511, Amendment and Response filed Aug. 7, 2008, 10 pgs.
U.S. Appl. No. 11/118,511, Notice of Allowance mailed Nov. 23, 2011, 7 pgs.
U.S. Appl. No. 11/118,511, Notice of Allowance mailed Dec. 6, 2011, 8 pgs.
U.S. Appl. No. 11/118,511, Office Action mailed Jan. 5, 2011, 7 pgs.
U.S. Appl. No. 11/118,511, Office Action mailed Dec. 15, 2008, 10 pgs.
U.S. Appl. No. 11/118,511, Office Action mailed Feb. 12, 2007, 5 pgs.
U.S. Appl. No. 11/118,511, Office Action mailed May 5, 2008, 9 pgs.
U.S. Appl. No. 11/118,511, Office Action mailed Jun. 14, 2011, 10 pgs.
U.S. Appl. No. 11/118,511, Office Action mailed Aug. 14, 2007, 8 pgs.
European Application 06737441.3, Communication mailed Apr. 3, 2013, 4 pgs.
Japanese Application 2008-508842, Notice of Rejection mailed Sep. 14, 2012, 7 pgs.
Japanese Application 2008-508842, Final Rejection mailed Jul. 5, 2013, 2 pgs.
Japanese Application 2008-508842, Decision to Decline the Amendment mailed Jul. 5, 2013, 5 pgs.
Chinese First Office Action in Application 201110199385.5, mailed Aug. 22, 2013, 11 pgs.
European Search Report in Application 13003975.3, mailed Oct. 17, 2013, 7 pgs.

* cited by examiner

AUTOMATIC WIRELESS DEVICE MESSAGE MANAGEMENT RESPONSIVE TO END USER PREFERENCES

CROSS-REFERENCE TO RELATED APPLICATIONS

This application is a continuation of and claims benefit to currently pending U.S. patent application Ser. No. 11/118, 511, entitled "AUTOMATIC WIRELESS DEVICE MESSAGE MANAGEMENT RESPONSIVE TO END USER PREFERENCES," filed on Apr. 29, 2005, now issued U.S. Pat. No. 8,155,624, which application is incorporated herein by reference in its entirety.

TECHNICAL FIELDS

Embodiments of the present invention generally relate to the field of voicemail retrieval for mobile devices. In particular, embodiments of this invention relate to dynamically retrieving messages according to end user preferences and configurations on wireless devices.

BACKGROUND OF THE INVENTION

The popularity of cellular or mobile devices has been increasing significantly. Unlike traditional corded or landline telephones, cellular or mobile devices offer improved portability, flexibility, and convenience to individuals to communicate with others. In addition, with factors such as continuing advances in mobile phone technology, reduction of billing plan prices, and ever-expanding coverage areas by mobile service providers (hereinafter "service providers"), cellular or other mobile wireless devices have become immersed into many people's everyday lives.

Currently, to use a wireless telephone, a user often purchases a wireless telephone with a one- or two-year billing plan or with a short-term contract (e.g., a month-to-month or pre-paid billing plan) offered by a service provider. The billing plan usually subjects the user to a monthly service fee for an allotted monthly wireless usage. For example, the monthly service fee may be $29.99 for wireless usage of 300 minutes per month. Additional minutes over the allotted monthly usage are charged to the user according to a per-minute rate (e.g., $0.40 per minute), and the user pays a roaming charge when the user is outside the service provider's coverage area. The billing plan customarily offers features such as voice mail, text messaging, caller identification (ID), call waiting, or the like. In addition, depending on the types of wireless telephones, the service provider may offer additional services such as ring-tone download, Internet access, sending email, sending email with pictures (e.g., especially with a wireless telephone equipped with a built-in digital camera), or the like.

Also, many wireless telephones provide features such as a telephone book, speed dialing, calendar, organizer, etc. As a result, the users customarily set personal device preferences, such as a particular ring tone when a particular person or a group of person (e.g., family members) calls. Alternatively, the users may input telephone numbers to the telephone book, set the clock according to the time zone, or the like.

While the users may set user preferences to the wireless telephone defining how to use the device, the users have not been able to set user preferences on the wireless telephone defining how to receive messages and/or telephone calls. For example, when the user fails to answer an incoming call, the service provider customarily routes the call to a voicemail messaging system managed by the service provider. The voicemail messaging system plays a prerecorded greetings (e.g., recorded by the user or assigned by system default) and prompts the caller to leave messages for the user. The messages are received and stored on the service provider's data storage for future playback.

To retrieve and listen to the voice messages, conventional wireless telephone systems typically send a visual or audible notification to the user's wireless telephone indicating that there is a voicemail waiting. The user must then call the voicemail messaging system, enter a password and navigate a set of menu options to retrieve the message. The wireless usage used to retrieve the message is typically counted against the user's allotted monthly usage. The calls may also be prolonged if the user wishes to replay the message due to poor reception or length of the message.

Some systems automatically push voicemail messages to the user's wireless telephone for storage. However, the user may not wish to store a long voicemail message on the wireless telephone or the wireless telephone may not have sufficient storage to store the message. Some other systems prompt the user to decide whether to download each message. These systems, however, require the user to make such a download decision every time a voicemail message notification is received. Even if the wireless telephone has sufficient storage to store the message, this repetitive interaction degrades the user experience.

Accordingly, client-initiated system for dynamically and automatically retrieving messages in response to end user preferences is desired to address one or more of these and other disadvantages.

SUMMARY OF THE INVENTION

Embodiments of the present invention enable a user to dynamically and automatically retrieve messages responsive to user preferences or rules on a wireless device. As such, the user may efficiently, conveniently, and automatically retrieve the messages. The user preferences may be user-specific, device-specific, or specific to a particular message type. Further, embodiments of the present invention monitor user interaction with the wireless device to dynamically generate the preferences. In one embodiment, the invention adapts the preferences to the configuration of the service providers (e.g., billing plan) to minimize the cost involved in downloading or listening to the voicemail messages. As a result, the invention greatly enhances the user experience on the wireless device.

According to one aspect of the invention, a computerized method automatically retrieves messages by a wireless telephone based on user preferences. The computerized method receives, on a wireless telephone, a notification indicating that a computing device has a message for a user. One or more rules associated with the user are evaluated based on the received notification. The rules specify one or more user preferences. The computerized method also automatically requests the message from the computing device as a function of the evaluated rules. The computerized method further receives the requested message from the computing device according to the specified user preferences. The received message is stored in a memory area of the wireless telephone for rendering to the user.

In accordance with another aspect of the invention, a system comprises a client wireless interface, a memory area, and a processor. The client wireless interface communicates with a server; the client wireless interface is associated with a client wireless device. The memory area stores retrieval conditions. The processor is configured to execute computer-executable instructions for monitoring interaction between a user and the client wireless device. The processor also executes computer-executable instructions for receiving a message waiting notification from the server via the client wireless interface and for dynamically generating the retrieval conditions stored in the memory area as a function of the monitored interaction. The processor further executes computer-executable instructions for evaluating, based on the received message waiting notification, the generated retrieval conditions and for automatically requesting a message from the server as a function of the evaluated retrieval conditions. In addition, the processor executes computer-executable instructions for receiving the requested message from the server and for storing the received message in the memory area for rendering to the user. The user interface renders the received message to the user in response to a request from the user.

According to a further aspect of the invention, one or more computer-readable media have computer-executable components for automatic retrieval of messages by a wireless telephone based on user preferences. An indicator component receives, on a wireless telephone, a notification indicating that a computing device has a message for a user. A rule component analyzes, based on the notification received by the indicator component, one or more preferences defined by the user. A retrieval component automatically requests the message from the computing device as a function of the analyzed preferences and receives the requested message from the computing device. A memory component stores the received message in a memory area of the wireless telephone for rendering to the user.

Alternatively, the invention may comprise various other methods and apparatuses.

Other features will be in part apparent and in part pointed out hereinafter.

Figure 1:
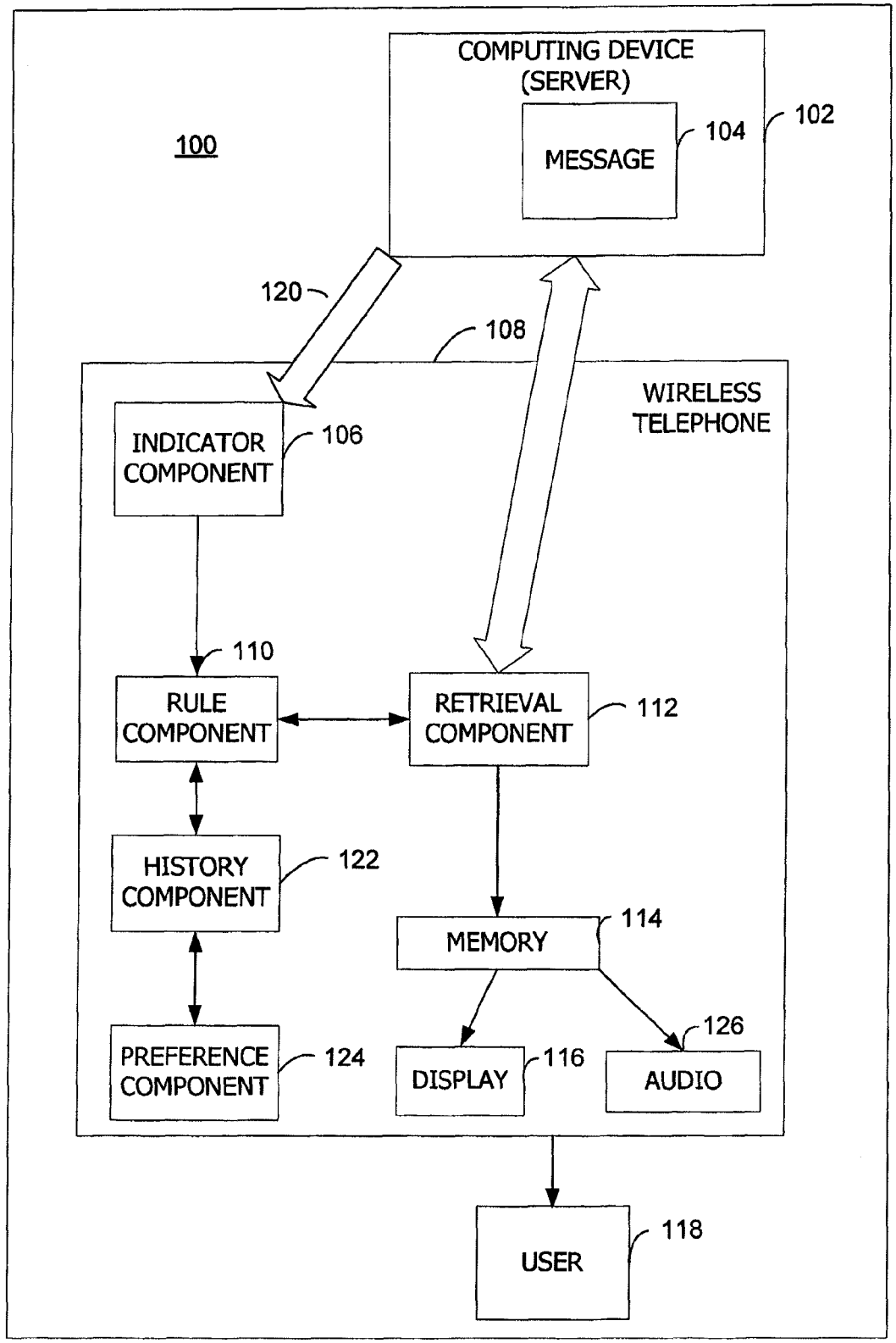
FIG. 1 is an exemplary diagram of a system for automatically retrieving messages by a wireless telephone based on user preferences according to one embodiment of the invention.

Appendix A includes exemplary pseudocode for automatically retrieving voicemail messages based on user preferences and environmental factors.

Corresponding reference characters indicate corresponding parts throughout the drawings.

DETAILED DESCRIPTION OF THE INVENTION

Referring first to FIG. 1, an exemplary diagram illustrates a system 100 for automatically retrieving messages by a wireless telephone 108 based on user preferences according to one embodiment of the invention. While FIG. 1 illustrates a wireless telephone, the invention is not limited to wireless telephones. The invention is operable with any wireless device or other device that provides access to messages and includes a storage area for the messages. The system 100 includes a computing device 102 and the wireless telephone 108. In one embodiment, the computing device 102 includes a computer, a computer server, or a collection of servers linked by a communication network (e.g., an intranet, an internet, or the like). In another embodiment, the computing device 102 may be a messaging computer system configured to process voice mail messages, text messages such as short message service (SMS) messages, instant messages, mobile messages, graphical messages (e.g., pictures, icon, or other graphical elements), electronic mails (i.e., emails) or the like for wireless service users. The computing device 102 may also include a storage medium such as a volatile memory, a non-volatile memory, or a combination of one or more volatile or non-volatile memory for storing data such as a message 104.

Figure 6:
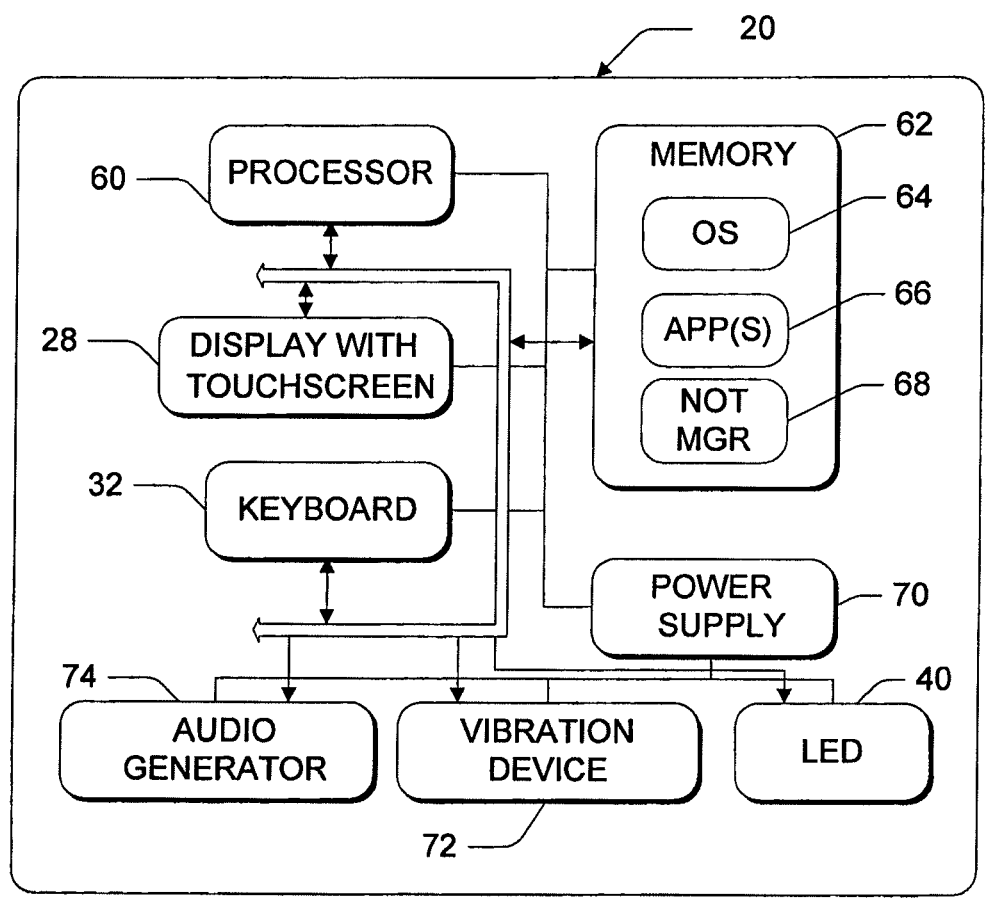
FIG. 6 is a block diagram illustrating an exemplary computing environment of a wireless telephone according to one embodiment of the invention.

The wireless telephone 108 may be a mobile/cellular telephone, a mobile device, a wireless device, a personal digital assistant (PDA), or other wireless device that is capable of sending and receiving messages such as the message 104. The wireless telephone 108 includes an indicator component 106, a rule component 110, a retrieval component 112, a memory 114, and a display 116. The wireless telephone 108 may also include a processor and other components as shown in FIG. 6. It is also to be understood that additional components or devices of the wireless telephone 108 may be implemented without departing from the scope of the present invention.

Initially, a user 118 establishes a wireless telephone service with a service provider which manages and controls aspects of the computing device 102. The wireless telephone service may include services such as caller ID, call waiting, voice mail, text messaging, or the like. When the user 118 fails to answer a telephone call made to the wireless telephone 108, the computing device 102 directs the call to a storage area accessible by the computing device 102 to prompt the caller to leave a message for the user 118. Once the caller leaves a message for the user 118, the computing device 102 sends a notification 120 in a form of signals containing data indicating that the message 104 is available for the user 118. The indicator component 106 uses, for example, an antenna (not shown) and a transceiver (not shown) of the wireless telephone 108 to receive the signals. Upon detecting the signals from the computing device 102, the indicator component 106 receives the notification 120 indicating that the computing device 102 has the message 104 for the user 118.

Figure 2:
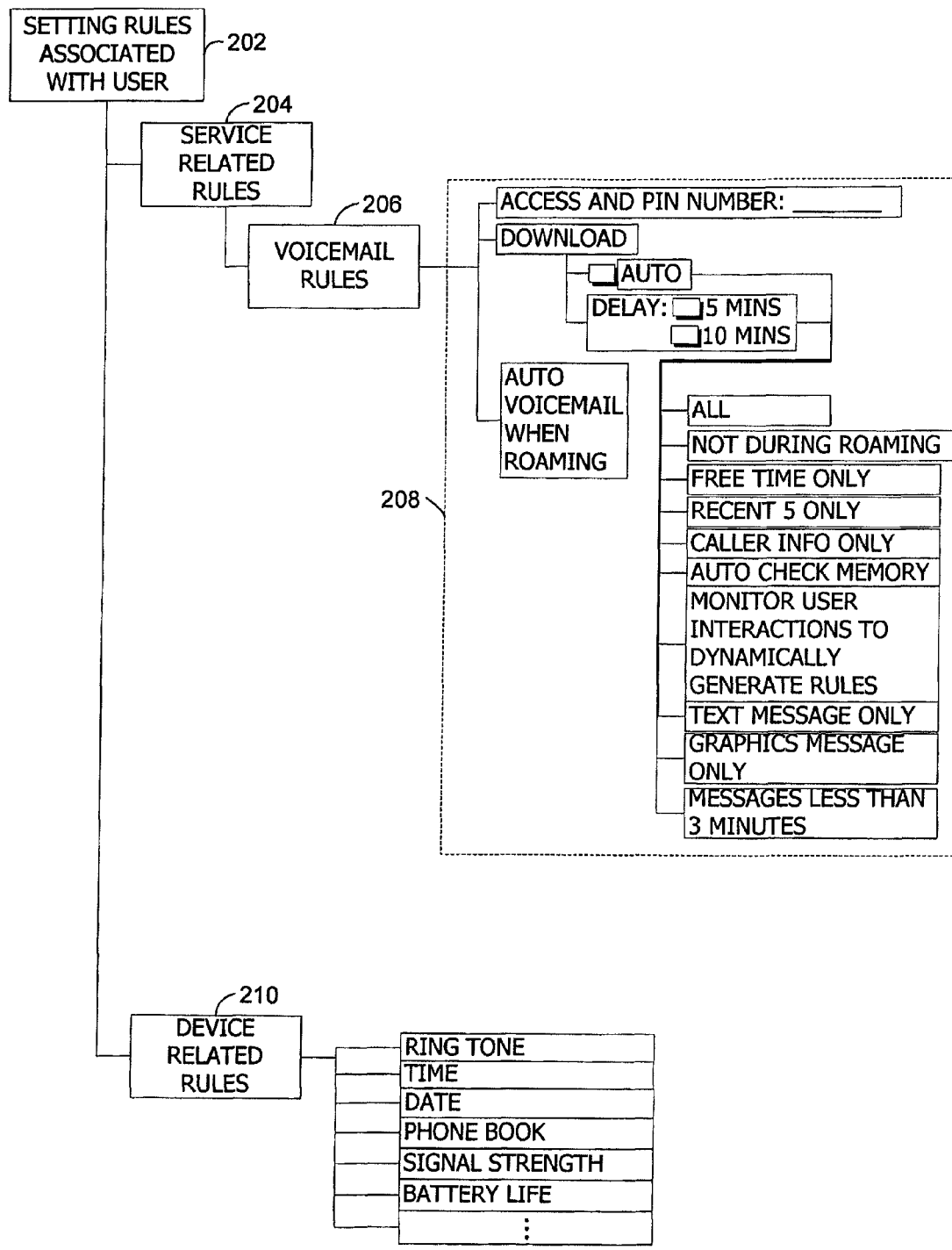
FIG. 2 is an exemplary diagram illustrating rules associated with the user on the wireless telephone according to one embodiment of the invention.

In response to the received notification 120 from the indicator component 106, the rule component 110 of the wireless telephone 108 evaluates one or more rules, preferences, or the like, associated with the user 118. FIG. 2 is an exemplary diagram illustrating exemplary rules or preferences 202 associated with the user 118 on the wireless telephone according to one embodiment of the invention. In particular, FIG. 2 describes an exemplary navigation menu for setting exemplary rules or preferences 202 associated with the user 118 on the wireless telephone 108. For example, the display 116 of the wireless telephone 108 presents to the user 118 a number of navigation rules or preferences in customizing the wireless telephone 108. One of the rules or preferences may be included in a rule option 202 for setting rules associated with the user. The rule option 202 further provides more detailed options such as a service rule option 204 and a device rule option 210. The service rule option may include a voicemail rule option 206 having a set of rules 208. In one embodiment, the set of rules 208 includes rules for access and pin number settings, download rules, and/or automatically instructing the computing device 102 to direct a caller to the user's voicemail box when the user 118 is outside the service provider's coverage area (e.g., roaming).

Still referring to FIG. 2, in particular, the "download" rules include additional provisions such as automatic download with no delay or automatic download after a delay of 5 or 10 minutes. The user 118 may also choose any of the following "download" rule options: download all messages; download messages not during roaming; download messages only during periods when the minutes are not counted against the user's overall wireless charges; download the most recent five messages only; download the caller's information only without downloading the actual voicemail message; automatically check the memory capacity of the wireless telephone 108 before downloading messages; download text messages only; download graphical messages only; or download messages that last less than three minutes. In one embodiment, the user may prefer to download only an initial portion of each message 104 and additional portions thereafter. For example, the user 118 may request via the GUI of the wireless telephone 108 to download another portion of the message 104. In this manner, the user may minimize the size of each message stored on the wireless telephone 108 and selectively minimize air time usage. In other words, the user 118 may select one or more rules in the set of rules 208.

In one embodiment, the user 118 may select the "monitor user interactions to dynamically generate rules" option in FIG. 2 to allow the wireless telephone 108 to dynamically generate rules. For example, suppose the user 118 selects this dynamic rule generation option when the user 118 first started using the wireless telephone 108. The rule component 110 analyzes the usage of the wireless telephone 108 by the user 118.

Still referring to FIG. 2, in an alternative embodiment where the user 118 has selected to have the wireless telephone 108 dynamically generate rules, the rule component 110 evaluates device-related metrics in generating rules or preferences. For example, the signal strength and battery usage of the wireless telephone 108 may determine when the messages may be retrieved from the computing device 102. For example, the rule component 110 may generate a rule that the wireless telephone would not download any voicemail message when the signal strength is less than 20% or the battery power strength is less than 10%. According to this rule, the retrieval component 112 would automatically requesting the message from the computing device 102 when the signal strength is about 80% or the battery power strength is about 90%.

In another example, if the billing plan of the user 118 provides that the user 118 has purchased 500 wireless minutes with unlimited usage on the weekends, the rule component 110 would dynamically generate rules such as ask the user 118 first to download voicemail messages during weekdays (i.e., Monday through Friday) or only download voicemail messages on the weekends (i.e., Saturday and Sunday) or at another specified time. In other words, in response to the user's interaction with and usage of the wireless telephone, the rule component 110 dynamically generates suitable rules to evaluate the received notification 120.

Returning to FIG. 1, in one embodiment, the wireless telephone 108 includes a history component 122 for monitoring and storing the user interaction with the wireless telephone 108. For example, the history component 122 monitors and stores the user's usage for a period of time to assist the rule component 110 to dynamically generate rules for the user. In another embodiment, the history component 122 monitors and stores the user's usage for a period of time that coincides with the billing plan cycle or contract term. For example, the user 118 may have a billing plan with a one-year contract. As such, the history component 122 may monitor and store the user's interaction on a semi-annual or an annual basis. On the other hand, the user 118 may have a month-to-month billing plan contract and the history component 122 automatically monitors and stores the user's interaction on a bi-weekly basis or the like. In yet another embodiment, the wireless component 108 also includes a preference component 124 for defining the preferences as a function of the interaction monitored and stored by the history component 122 or as a function of input received from the user via a graphical user interface (GUI) (not shown). For example, the preference component 124 interacts with the history component 122 and presents a set of preferred rules to the user 118 via the display 116. Such preferred rules may be further monitored and stored by the history component 122 for future use by the preference component 124.

In FIG. 1, as the rule component 110 analyzes one or more preferences or rules defined by or associated with the user based on the notification 120 received by the indicator component 106, the retrieval component 112 automatically requests the message 104 from the computing device 102 as a function of the evaluated rules. In one embodiment, the retrieval component 112 places a call to the computing device 102 to retrieve the message 104 as a function of the evaluated rules. For example, if the rule component 110 determines that the user 118 prefers to download each message having a duration of less than three minutes at 9:05 P.M. every day, the retrieval component 112 automatically requests the message 104, if any, that is less than 3 minutes at sometime immediately prior to 9:05 P.M. from the computing device 102. In other words, instead of requesting a confirmation or asking the user 118 to decide whether to download the messages every time the notification 120 is received, the retrieval component 112 automatically requests the message 104 to be downloaded from the wireless telephone 108 to the computing device 102. As such, embodiments of the present invention advantageously provide flexible and convenient usage of the wireless telephone 108 to the user 118.

The user experience differs from that of a push system such as in conventional systems where all messages 104 are pushed from the computing device 102 to the wireless telephone 108 upon receipt of each message 104 by the computing device 102. In such conventional systems, the user 118 lacks control of how and when the message 104 should be received. Instead, a client-initiated pull based on a set of preferences and rules according to aspects of the present invention as shown in FIG. 2 permits the user 118 to download and access the message 104 according to user preference. Such advantages further reduce the user's cost of using the wireless telephone 108.

After automatically requesting the message 104 from the computing device 102, the wireless telephone 108 receives the message 104 via the antenna and the transceiver (not shown). The wireless telephone 108 stores the received message 104 in the memory 114 and renders the message to the user 118 via the display 116 or an audio component 126 (for voicemail messages) when requested by the user 118.

In another embodiment, other rules, options, choices, or settings may be included in the set of rules 208 for the user 118. While FIG. 2 describes the set of rules 208 in response to the voicemail rules 206, different sets of rules 208 may apply to other types of messages, such as text messages, graphical messages, or email messages on the wireless telephone 108. As such, in this alternative embodiment, the user 118 may define or the rule component 110 may dynamically generate one or more rules relating to the text message, such as the user 118 only receives text messages from recognizable telephone numbers from the user's telephone book or not to receive any text messages except those sent by the service provider. Such rules aid in limiting the amount of text message spam that may be received by the wireless telephone 108, thereby reducing air time costs. As such, the retrieval component 112 automatically requests or automatically inhibits requesting the message from the computing device 102 as a function of the preferences or rules analyzed or evaluated by the rule component 110.

Figure 3:
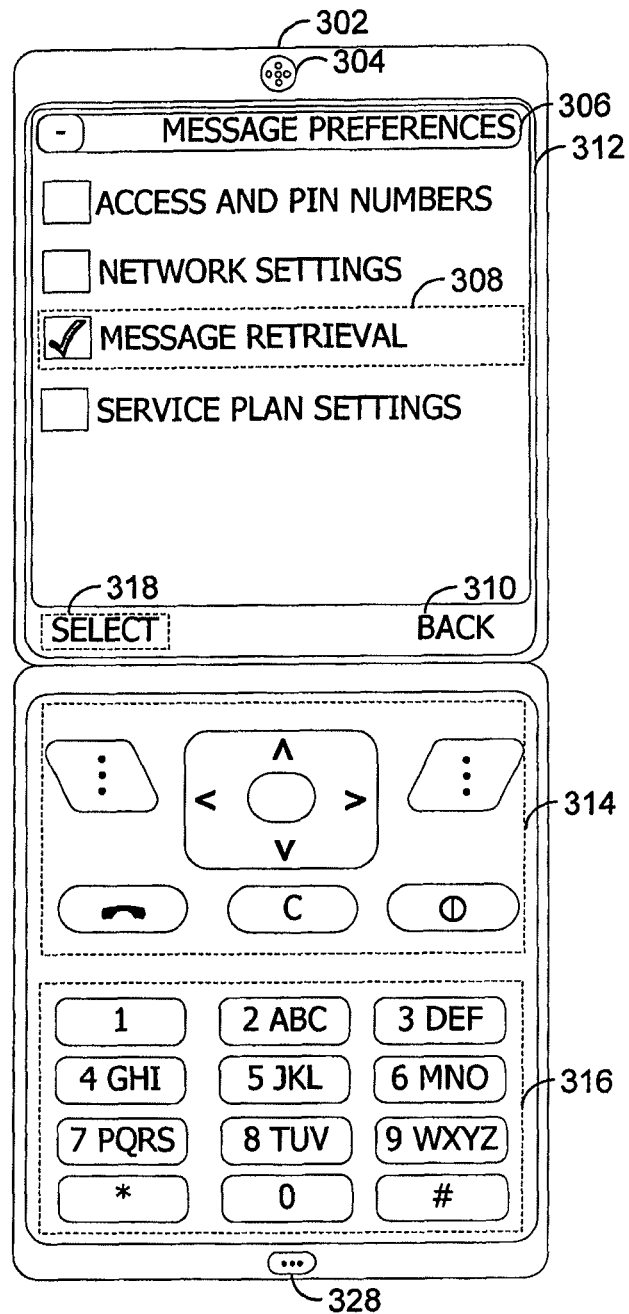
FIGS. 3-4 are exemplary diagrams illustrating a user interface of a wireless telephone according to one embodiment of the invention.
Figure 4:
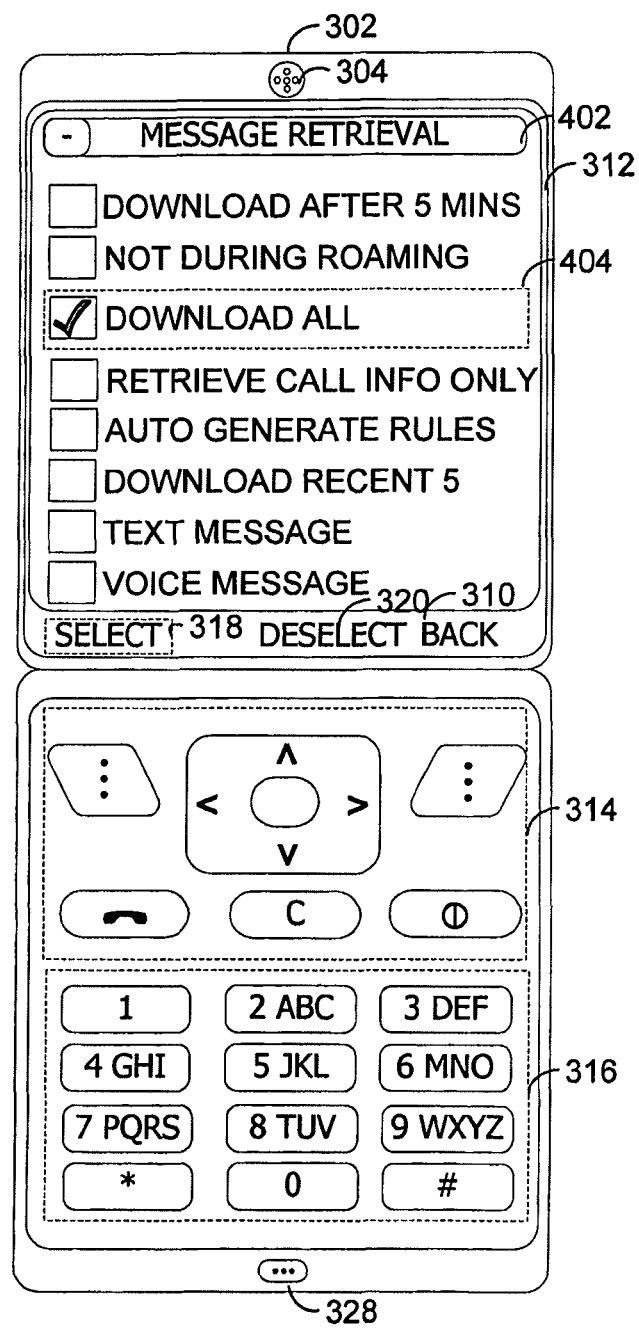

Referring now to FIGS. 3-4, exemplary diagrams illustrate a graphical user interface of a wireless telephone 302 according to an embodiment of the invention. The wireless telephone 302 includes a speaker 304, a microphone 328, a display 312, a set of navigation buttons 314 and a dial pad 316. It is to be understood that other components such as the antenna, transceiver, power source, wireless interface (e.g., client wireless interface), or other known functional components of a wireless telephone or wireless device may be included in the wireless telephone 302 and are not shown in FIGS. 3-4. It is to be further understood that the wireless telephone 302 may have any number of physical configurations without deviating from the scope of the invention.

As shown in FIG. 3, the display 312 shows an interactive user preference or rule menu for user to set message preferences. A heading 306 displays the heading to which a group of sub-headings belong. For example, in the message preferences heading 306, a number of sub-headings or preferences the user 118 may select, such as "access and pin numbers," "network settings," "message retrieval," and "service plan setting." It is to be understood that other options, headings or preferences may be included under the "Message Preferences" heading 306 or other headings.

Still referring to FIG. 3, as known to those skilled in the art, the user 118 may use one or more buttons in the set of the navigation buttons 314 to navigate the menu or options shown on the display 312. For example, the user 118 selects the option or preference "message retrieval" (as shown by the dashed box 308 with a check mark in the box in front of the option) by using the buttons in the set of navigation buttons 314 (as shown by a dashed box 318 covering the word "SELECT"). Alternatively, the user 118 may select "BACK" button 310 to return to the previous menu or category.

In response to the user's selection of "message retrieval," FIG. 4 shows a set of additional rules or preferences under a heading "message retrieval" 402. The "message retrieval" heading 402 may include rules or preferences such as: download with five-minute delay; do not download during roaming coverage area; download all messages; retrieve caller and/or call information only; automatically and dynamically generate rules; download the most recent five messages only; download text messages only; or download voice messages only. It is to be understood that other rules or preferences may be available to the user 118. The user 118 may again select one or more rules or preferences by using the buttons in the navigation buttons 314. For example, the user 118 selects the "download all" rule as shown by a dashed box 404 with a check mark in front of the rule. In one embodiment, the wireless telephone 302 provides a visual or an audible confirmation to the user 118 via the display 312 or the speaker 304 upon selection of one or more rules or preferences. In another embodiment, the user 118 may select the "deselect" button 320 to unmark one or more rules or preferences.

Figure 5:
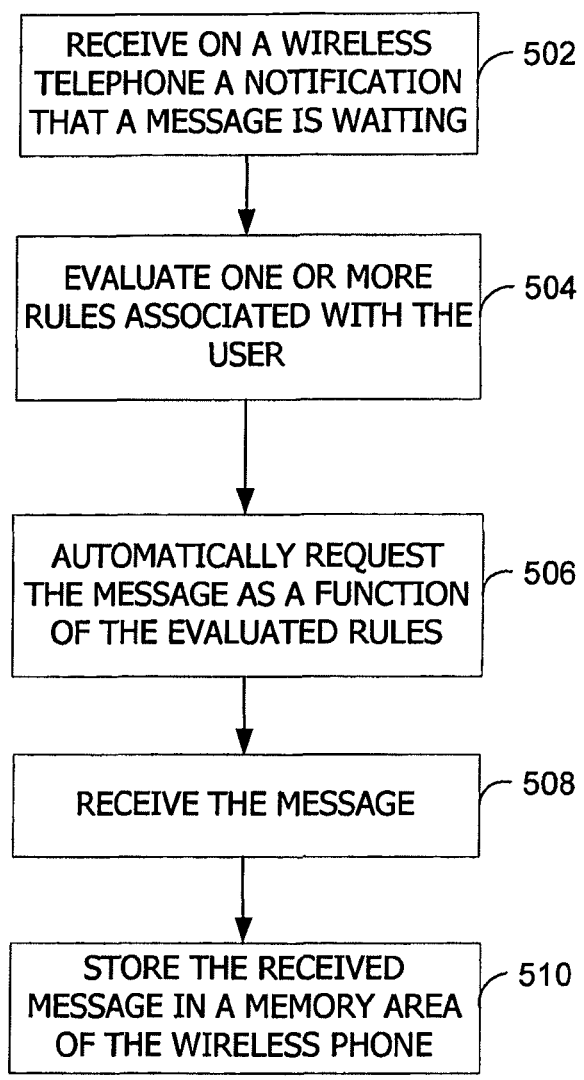
FIG. 5 is a flow chart illustrating a method for automatically retrieving messages by a wireless telephone based on user preferences according to one embodiment of the invention.

FIG. 5 is a flow chart illustrating a method for automatically retrieving messages by a wireless telephone based on user preferences embodying aspects of the invention. Initially, a wireless telephone user subscribes to a wireless telephone service with a service provider and the wireless telephone service includes features such as voicemail, caller ID, or other services. Typically, when the user fails to answer an incoming telephone call from a caller, the caller is directed to a system managed by the service provider (e.g., computing device 102) and is prompted to leave a message (e.g., a voicemail message). Once the caller leaves a message for the user, the computing device 102 sends a notification and the wireless telephone receives the notification that the message is waiting at 502. In response to the received notification, at 504, the rule component 110 of the wireless telephone evaluates one or more rules associated with the user. In one embodiment, the user may define the preferences or the rules. In another embodiment, the history component 122 may monitor and store the one or more rules associated with the user and the preference component 124 may define the preferences as a function of the interaction monitored and stored by the history component.

Still referring to FIG. 5, at 506, the retrieval component 112 automatically requests the message as a function of the evaluated rules. For example, suppose the user has defined a rule or preference that she prefers to download the message during off-peak periods (e.g., after 9:00 P.M. till 6:00 A.M. of the next day). As such, if the time when the wireless telephone receives the notification is at 5:32 P.M., the retrieval component 112 would not download the message at 5:33 P.M. Instead, the retrieval component 112 would download the message at 9:01 P.M. or at a time during the off-peak period when the wireless telephone service is active (i.e., the wireless telephone is within the coverage area or the wireless telephone is turned on). The retrieval component 112 may, however, notify the user of the received message notification to allow the user to manually access the message. The wireless telephone would next receive the message at 508 and the received message is stored in a memory area of the wireless telephone at 510 for the user. In one embodiment, the wireless telephone 108 is placed in an automatic retrieval mode to perform elements 504, 506, 508, and 510. After such performance, the wireless telephone 108 is removed from the automatic retrieval mode. In one embodiment, one or more computer-readable media have computer-executable instructions for performing the method illustrated in FIG. 5.

Pseudocode for a method such as shown in FIG. 5 is included in Appendix A.

FIG. 6 shows functional components of a wireless telephone 20 such as wireless telephone 108 of the invention which may be may be a handheld computing device, a personal digital assistant (PDA), a wireless messaging device, or the like. In another embodiment, the wireless telephone may be included in a general computing device (e.g., system 130 in FIG. 7), or the like for receiving voice, text, or graphical messages. The wireless telephone has a processor 60, a memory 62, a display 28, and a keyboard 32. The memory 62 generally includes both volatile memory (e.g., RAM) and non-volatile memory (e.g., ROM, PCMCIA cards, etc.). An operating system 64 is resident in the memory 62 and executes on the processor 60. The wireless telephone 20 includes an operating system for controlling the allocation and usage of hardware resources such as the memory 62, the processor 60, disk space, and peripheral devices (e.g., keyboard 62).

One or more application programs 66 are loaded into memory 62 and run on the operating system 64. Examples of applications include email programs, scheduling programs, personal information management (PIM) programs, word processing programs, spreadsheet programs, Internet browser programs, and so forth. The wireless telephone 20 also has a notification manager 68 loaded in memory 62, which executes on the processor 60. The notification manager 68 handles notification requests from the applications 66.

The wireless telephone 20 has a power supply 70, which is implemented as one or more batteries. The power supply 70 might further include an external power source that overrides or recharges the built-in batteries, such as an AC adapter or a powered docking cradle.

The wireless telephone 20 is also shown with three types of external notification mechanisms: an LED 40, a vibration device 72, and an audio generator 74. These devices are directly coupled to the power supply 70 so that when activated, they remain on for a duration dictated by the notification mechanism even though the processor 60 and other components might shut down to conserve battery power. The LED 40 preferably remains on indefinitely until the user takes action. The current versions of the vibration device 72 and audio generator 74 use too much power for today's batteries, and so they are configured to turn off when the rest of the system does or at some finite duration after activation.

Figure 7:
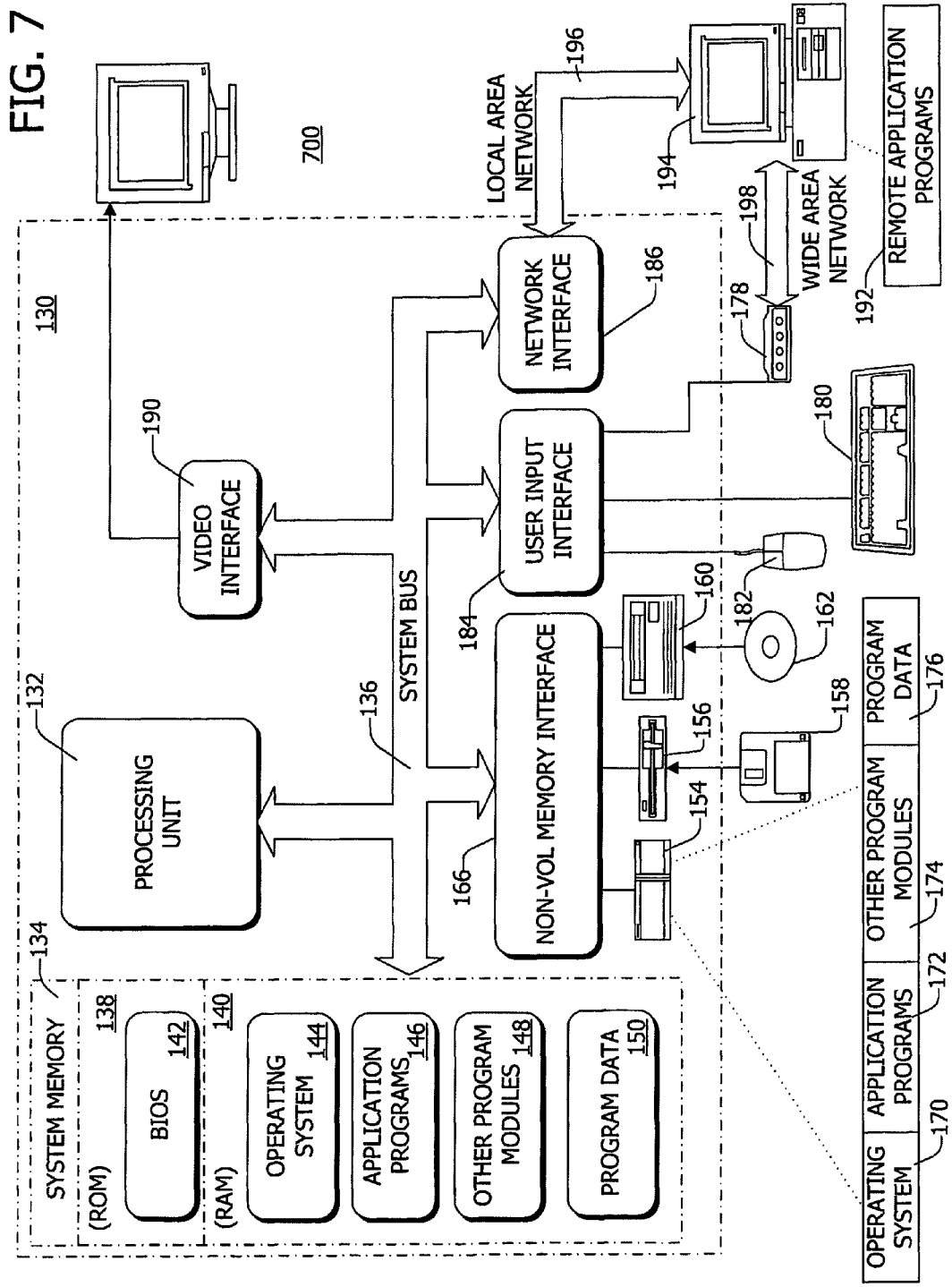
FIG. 7 is a block diagram illustrating one example of a suitable computing system environment in which the invention may be implemented.

FIG. 7 shows one example of a general purpose computing device such as computing device 102 in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 5 to implement the invention.

The invention includes means for generating the retrieval conditions relating to the text message, means for monitoring interaction between the user and the client wireless device, means for dynamically generating the retrieval conditions, and means for evaluating the retrieval conditions. Hardware and software such as a data structure, a user interface, an application program, an application programming interface (API), computer-executable instructions, firmware, and the like (such as illustrated in the figures) constitute means for generating the retrieval conditions relating to the text message, means for monitoring interaction between the user and the client wireless device, means for dynamically generating the retrieval conditions, and means for evaluating the retrieval conditions.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above methods and systems without departing from the scope of the invention, it is intended that all matter contained in the above description and shown in the accompanying drawings shall be interpreted as illustrative and not in a limiting sense.

APPENDIX A

The pseudocode below defines an exemplary routine for automatically retrieving voicemail messages based on user preferences. The routine is triggered by the receipt of a voicemail notification from the cellular network.

```
On receipt of voicemail-is-waiting notification from cellular network
{
    ShowVoicemailIcon( );
// The above routine causes a message waiting icon to appear on
the display of the mobile phone
    if (user has not provisioned the voicemail call center number)
        return;
    if (user has not provisioned the voicemail PIN)
        return;
    if ((user is roaming)
        AND
        (user does not want retrievals to occur when roaming))
        return;
    if (signal strength is below x%)
        return;
    if (battery remaining is below y%)
        return;
// The signal strength and battery life checks above show how
// environmental factors can figure into the retrieval system. These factors
// can be pre-configured by the software to sensible defaults as well as
// exposed to users for adjustment. The goal is to prevent making calls that
// might drain the battery completely or that, because of low signal, cause
the retrieval system to work sub-optimally.
    AllowConfiguredDelayToElapse( );
// The above routine "waits" for a certain amount of time to pass once
// the voicemail notification is received from the cellular network. Only
// after this time has elapsed will the retrieval be performed. This gives
the user a chance to fetch the voicemail message manually if so desired.
    if (user is currently in a call)
        return;
    DisplayRetrievalMessage( );
    FetchMessages( );
    if (user wants retrieved messages to be deleted from call center)
        delete retrieved messages from call center;
    HideRetrievalMessage( );
// The "DisplayRetrievalMessage( )" and "HideRetrievalMessage( )"
// routines indicate to the user that a retrieval is taking place (which
// implies that a call is being made). If the user attempts to place an
outgoing call, the retrieval is cancelled.
    return;
}
```

What is claimed is:

1. A system for retrieving messages, the system comprising:
   at least one processor; and
   memory encoding computer executable instructions that, when executed by the at least one processor, perform a method for retrieving messages based on user preferences, the method comprising:
   receiving a notification indicating that a computing device has a message for delivery to a user;
   analyzing one or more preferences for receiving and processing the message, wherein at least one of the one or more preferences comprises a user preference that specifies a delayed automatic download after a period of time;
   requesting the message from the computing device as a function of the one or more preferences, wherein the message includes an initial portion of the message with a remaining portion to be requested at a later time; and
   storing the received message.

2. The system of claim 1, wherein at least one of the one or more preferences delays retrieval of the message based upon battery power.

3. The system of claim 1, wherein at least one of the one or more preferences delays retrieval of the message based upon signal strength.

4. The system of claim 3, wherein retrieval is delayed when a non-zero wireless signal strength of the wireless telephone is less than a threshold value.

5. The system of claim 1, wherein the method further comprises defining the preferences as a function of input received from the user.

6. The system of claim 1, wherein the message comprises one or more of the following: a voice mail message, a text message, an electronic mail message, a video clip, and an image.

7. The system of claim 1, wherein the method further comprises monitoring interaction between the user and the client wireless device.

8. The system of claim 7, further comprising generating at least one of the one or more preferences based upon the interaction between the user and the client wireless device.

9. A computer storage media encoding computer executable instructions that, when executed by at least one processor, perform a method for retrieving messages based on user preferences, the method comprising:
   receiving a notification indicating that a computing device has a message for delivery to a user, said notification not containing the message, said message including an initial portion and a remaining portion;
   evaluating, based on the received notification, one or more rules, wherein at least one of the one of the one or more rules comprises a user preference that specifies a delayed automatic download after a period of time;
   in response to evaluating the rules, requesting the initial portion of the message, and further comprising requesting the remaining portion of the message at a later time; and
   storing the received message.

10. The computer storage media of claim 9, wherein the message comprises one or more of the following: a voice mail message, a text message, an electronic mail message, a video clip, and an image.

11. The computer storage media of claim 9, wherein the rules specify one or more user preferences.

12. The computer storage media of claim 9, wherein the rules specify a specific time at which to request the message.

13. The computer storage media of claim 9, wherein the rules delay requesting the message based upon battery power.

14. The computer storage media of claim 9, wherein the rules delay requesting the message based upon signal strength.

15. The computer storage media of claim 9, wherein the method further comprises defining the preferences as a function of input received from the user.

16. A client wireless device comprising:
- a client wireless interface for communicating with a server, said client wireless interface being associated with the client wireless device;
- a memory area of the client wireless device, said memory area storing computer-executable instructions and retrieval conditions, said retrieval conditions defining preferences for retrieving a message yet to be delivered to a user via the client wireless device from the server;
- a processor configured to execute the computer-executable instructions stored on the client wireless device to perform a method for retrieving messages based on user preferences, the method comprising:
  - receiving a notification indicating that a computing device has a message for delivery to a user, said notification not containing the message, said message including an initial portion and a remaining portion;
  - evaluating, based on the received notification, one or more rules stored in the memory area, wherein at least one of the one of the one or more rules comprises a user preference that specifies a delayed automatic download after a period of time;
  - in response to evaluating the rules, requesting the initial portion of the message, and further comprising requesting the remaining portion of the message at a later time; and
  - storing the received message, wherein storing the retrieved message comprises storing the remaining portion of the message along with the initial portion of the message.

17. The client wireless device of claim 16, wherein the message comprises one or more of the following: a voice mail message, a text message, an electronic mail message, a video clip, and an image.

18. The client wireless device of claim 16, wherein the method further comprises defining the rules as a function of input received from the user.

19. The client wireless device of claim 18, further comprising generating at least one of the one or more rules based upon the interaction between the user and the client wireless device.

20. The client wireless device of claim 16, wherein at least one of the one or rules specifies that messages are downloaded during circumstances when no charge is incurred against the wireless account.

* * * * *